March 16, 1954  C. F. VOYTECH  2,672,357
HYDRAULICALLY LOCKED SEAL
Filed Oct. 8, 1948

INVENTOR.
Charles F. Voytech

Patented Mar. 16, 1954

2,672,357

UNITED STATES PATENT OFFICE 2,672,357

HYDRAULICALLY LOCKED SEAL

Charles F. Voytech, Chicago, Ill., assignor to Crane Packing Company, Chicago, Ill., a corporation of Illinois Application October 8, 1948, Serial No. 53,437

4 Claims. (Cl. 286—9)

This invention relates to mechanical rotary seals and particularly to a rotary seal which is hydraulically locked against an inadvertent opening thereof.

The principal object of this invention is to provide a rotary mechanical seal wherein the relatively rotatable seal parts are held in frictional contact with one another with a predetermined pressure, with means for restricting any separation of the parts due to vibration, minute explosions of gases between the relatively rotating parts, etc.

A more specific object of this invention is to provide a seal for relatively rotatable elements wherein the relatively rotating parts of the seal are held in frictional contact by means of fluid pressure supplied by an irreversible mechanism.

A still more specific object of this invention is to provide a seal for relatively rotatable elements wherein the seal is effected between radial surfaces on the relatively rotatable elements, said surfaces being held in contact with one another by a hydraulically actuated piston, the pressure for which is supplied through a conduit having a check-valve therein which permits fluid to enter behind the piston to hold the surfaces in contact but prevents fluid from leaving the piston chamber and hence locks the surfaces in their contacting position.

Figure 1:
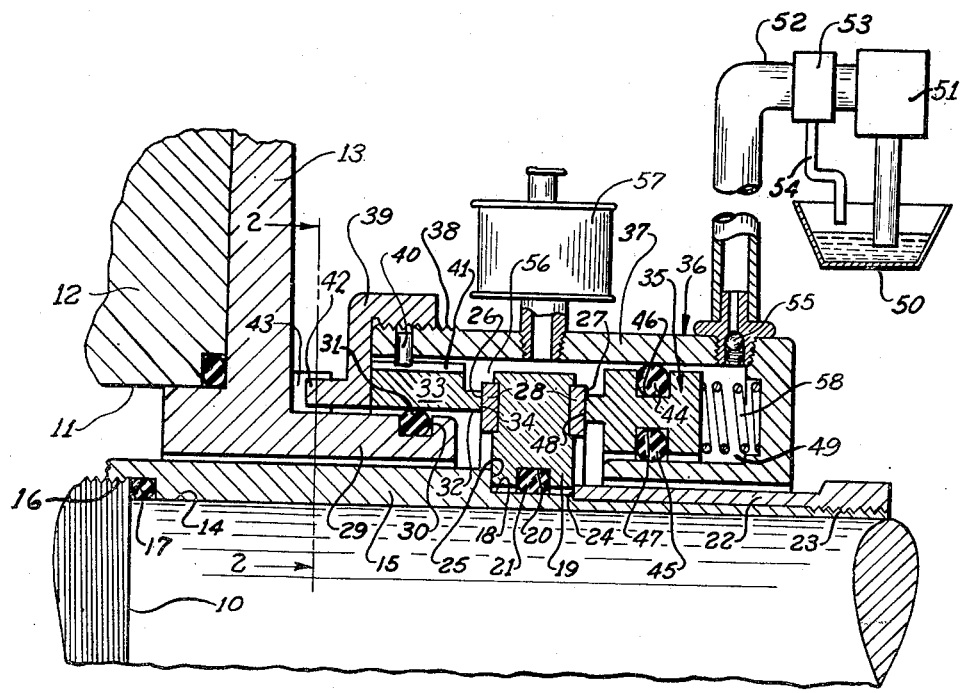
Figure 2:
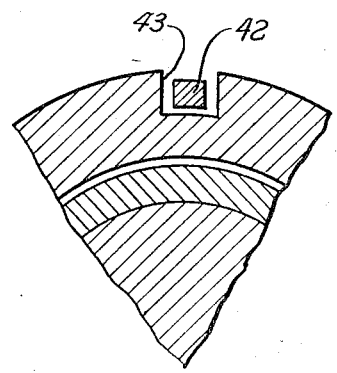

These and other objects and features of this invention will become apparent from the following detailed description when taken together with the accompanying drawings, in which Fig. 1 is a fragmentary side elevation in section of a seal embodying the features of this invention; and Fig. 2 is a fragmentary end view of the drive means for the seal of Fig. 1, the end view being taken along line 2—2 of Fig. 1.

Referring now to the drawings for a detailed description of the invention, there is shown a shaft 10 which extends through an opening 11 in a housing 12 of a pump or the like, said opening 11 being partly enclosed by closure-plate 13. Shaft 10 is formed with a step 14 on which is disposed a sleeve 15 having a threaded connection 16 with shaft 10 and being sealed with respect thereto by means of a ring 17 of packing or the like.

Sleeve 15 is in turn formed with a step 18 on which is mounted a collar 19 having an annular groove 20 on the interior surface thereof, and an endless ring 21 of resilient deformable material such as rubber or the like is compressed in groove 20 to form a fluid-tight seal between sleeve 15 and collar 19. Said collar 19 is clamped to sleeve 15 by a second sleeve 22 which is threaded at 23 to sleeve 15 and which is provided with a radially disposed surface 24 which contacts collar 19 and holds said collar against the shoulder 25 formed by step 18. Second sleeve 22 thus serves to clamp collar 19 to sleeve 15 and causes the collar to rotate with the shaft 10.

Collar 19 has formed thereon a pair of parallel radially disposed surfaces 26 and 27 which are suitably ground and lapped so as to be perfectly flat and smooth. Where severe abrading conditions exist, the surfaces 26 and 27 may be formed on inserts 28 of Stellite or other extremely hard material. Thus collar 19 and the surfaces 26 and 27 form one part of the rotary mechanical seal of this invention.

Closure-plate 13 has an axial flange 29 extending therefrom in the direction of collar 19. A groove 30 is formed in the outside surface of flange 29 and a ring 31 of packing of resilient deformable material such as rubber or the like is disposed in groove 30 and compressed therein by the interior surface 32 of a sealing washer 33, surface 32 being substantially cylindrical so as to permit relative axial movement between washer 33 and flange 29. Ring 31 may be of circular radial cross-section commonly called an O ring. Washer 33 is formedy with a radially disposed surface 34 which bears frictionally upon surface 26 of collar 19 and is similarly made perfectly flat and smooth so as to form with surface 26 a fluid-tight running joint.

Washer 33 is held against collar 19 by means of an annular piston 35 operating in an annular cylinder 36. Said cylinder 36 has a wall 37 which extends over and surrounds collar 19 and washer 33. The left-hand end (Fig. 1) of cylinder 36 is exteriorly threaded at 38 to leave end cap 39 extending radially inwardly behind washer 33. A pin 40 in cylinder wall 37 extends radially inwardly into an axially disposed groove 41 in the exterior surface of washer 33. Said washer 33 is thus constrained against relative rotation with respect to cylinder wall 37.

It will be apparent thus far that axial movement of cylinder 36 to the right as viewed in Fig. 1 will be transmitted through cylinder wall 37 and end cap 39 to washer 33 and that said washer 33 may be held in contact with collar 19 as long as cylinder 36 is urged in a right-hand direction.

Relative rotation between cylinder 36 and closure-plate 13 is prevented by a tongue-and-groove connection between end cap 39 and closure-plate 13. This connection is shown in Fig. 2 and comprises a tongue 42 on end cap 39 extending into groove 43 on closure-plate 13. The tongue-and-groove connection thus permits cylinder 36 to move axially relative to closure-plate 13 but prevents relative rotation therebetween.

Piston 35 is supported and sealed with respect to cylinder 36 by a pair of sealing rings 44 and 45, disposed in grooves 46 and 47, respectively, in piston 35. The packing rings 44 and 45 may similarly be formed as endless rings of resilient deformable material such as rubber having circular radial cross-sections. However, it is not contemplated that rings 44 and 45 will be sufficiently resilient to extrude into the clearance space between piston 35 and cylinder 36. Where greater cost is permissible, sealing rings 44 and 45 are omitted and a fluid-tight seal is effected by lapping the piston and cylinder walls. Said piston 35 is also provided with a radially disposed surface 48 which is made perfectly flat and smooth and which bears against surface 27 on collar 19. It is contemplated in the form chosen for illustration herein that surfaces 48 and 27 will form a fluid-tight seal, although in other forms of this invention such a fluid-tight seal is not necessary.

The pressure for urging piston 35 against collar 19 is supplied by liquid under pressure in chamber 49 formed in cylinder 36. The liquid is supplied from a sump 50 through a pump 51 and conduit 52. Alternatively, if the shaft 10 is used to drive a pump for liquids, the conduit 52 may be connected to the high pressure side of the pump and pump 51 may then be eliminated. A pressure relief valve, shown schematically at 53, controls the pressure in chamber 49, and the valve is preferably made adjustable so that any desired pressure may be obtained. The overflow from the relief valve is conducted through conduit 54 back to sump 50.

It will be apparent that the liquid under pressure in chamber 49 will tend to urge piston 35 to the left until it contacts collar 19, whereupon cylinder 36 will move to the right until washer 33 contacts collar 19 likewise. Washer 33 will then be held against collar 19 by a pressure equal to the total hydraulic pressure acting upon the cylinder 36. It is contemplated that the liquid pumped is incompressible such as oil or water.

In order to prevent an undue or unwanted opening or separation of the sealing surfaces 26 and 34, a check-valve 55 is inserted in conduit 52. The check-valve is so disposed that fluid may enter chamber 49 freely but will close instantaneously when the pressure in chamber 49 exceeds that in conduit 52. Thus a separation of surfaces 26 and 34 may take place only if piston 35 is moved to the right as viewed in Fig. 1 relative to cylinder 36, and this movement cannot take place unless there is a flow of fluid from chamber 49 into conduit 52. The presence of check-valve 55, however, prevents this reverse flow of fluid and hence washer 33 is locked in place against collar 19 by the piston 35 and trapped fluid in chamber 49.

The space 56 within cylinder wall 37 and washer 33 and collar 19 may be filled with a suitable lubricant, provided end cap 39 is properly sealed with respect to washer 33. Such a seal may be effected by making the cooperating surfaces of the end cap and washer perfectly flat and smooth so as to be sure they are fluid-tight. It is preferred that any gasket inserted between washer 33 and end cap 39 for this purpose be relatively hard so as to transmit undiminished any movement of washer 33 to cylinder wall 37 and to the fluid in space 49. The lubricant for space 56 may be supplied by an oil cup 57 or any similar reservoir of known character.

It will be observed that insofar as washer 33 is concerned, any pressure exerted by fluid in the space between the shaft 10 and flange 29 will be completely balanced and will have no effect upon the position of the said washer. Alternatively, the surface 32 of washer 33 may be stepped either up or down in proximity to collar 19 so as to exert an axial force on the washer either to the left or the right, respectively, as may be desired, thus utilizing the pressure of the fluid in the space between the shaft 10 and flange 29 to help seal or unseal the fluid.

In order to maintain a seal between washer 33 and collar 19 when no fluid pressure is available in chamber 49, one or more springs 58 may be provided, the springs being compressed between piston 35 and cylinder 36. These springs are continuously effective in the same manner as the fluid in chamber 49 to urge washer 33 against collar 19, but of course are compressible and hence will not be effective to lock the washer against the collar in the event of the generation of separating forces between surfaces 26 and 34.

It will be noted that collar 19, washer 33, piston 35, cylinder 36 and end cap 39 form a sealed unit which may be assembled at the factory of the seal manufacturer. Installation of such a unit involves merely inserting packing ring 31 in groove 30 on flange 29 and then slipping the entire unit over sleeve 15 until collar 19 abuts on shoulder 25. The secondary sleeve 22 is then threaded over sleeve 15 until it clamps the collar securely against shoulder 25. Connections are then made to the conduit 52 and oil or other lubricant supplied to cup 57 when the seal is ready for use. Since the unit is positioned from collar 19, vibrations of the shaft, either in a rotary or axial direction, will be followed by the entire unit, the seal being maintained through the resilience of the packing 31.

The balancing of washer 33 and the single collar rotating between two seal rings, with a single spring for holding the seal rings against the collar are disclosed and claimed in my copending application, Serial No. 1,854, filed January 12, 1948 now Patent No. 2,470,419, issued May 17, 1949.

It is understood that the foregoing description is illustrative of preferred embodiments of this invention and that the scope of the invention is not to be limited thereto, but is to be determined by the appended claims.

What is claimed is:

1. A mechanical seal for effecting a fluid-tight seal between a shaft and a housing therefor, said seal comprising a collar encircling the shaft, means for sealing the collar with respect to the shaft, means for driving the collar from the shaft, radially disposed sealing surfaces on each side of the collar, a sealing washer contacting one of the sealing surfaces, means for sealing the washer with respect to the housing, an annular piston contacting the other of said sealing surfaces, an annular cylinder in which the piston is disposed, a source of fluid under pressure, means conducting the fluid to the cylinder, a check-valve in the conducting means arranged to admit fluid into the cylinder and to prevent fluid from leaving the cylinder, spring means in compression in the cylinder and acting upon the piston to urge the piston toward the collar, a wall extending from the cylinder in proximity to the sealing washer, a flanged cap on the wall and abutting on the washer, means for preventing relative rotation between the washer and wall and means for preventing relative rotation between the cap and housing.

2. A mechanical seal for relatively rotatable elements, said seal comprising a collar rotatable with one of the elements, means for effecting a seal between the collar and the said one of the elements, a sealing washer adjacent the collar and adapted to form a running seal therewith, means for sealing the washer with respect to the other element, and means for preventing the washer from becoming separated from the collar to permit fluid to pass therethrough, said means comprising a cylinder independent of the shaft surrounding the washer and collar and extending beyond the collar to the side thereof opposite the side on which the washer is disposed, a piston in said cylinder adapted to bear against the said opposite side of the collar, means for admitting fluid under pressure into the cylinder on the side of said piston remote from said collar, means for transmitting the fluid reaction from the cylinder to the washer to cause the washer to bear against the collar, and automatically operable means for preventing escape of the fluid from the cylinder.

3. A mechanical seal as described in claim 2, the means for transmitting the fluid reaction from the cylinder to the washer comprising a cap secured to the cylinder, said cap abutting on the back of the washer, and means on the cap for preventing relative rotation between the cap and the said other element.

4. A mechanical seal for effecting a seal between a shaft and a housing having an opening through which the shaft extends, said seal comprising a collar mounted on and surrounding the shaft and rotatable therewith, a sealing washer surrounding the shaft adjacent the collar, opposed sealing surfaces on said collar and washer respectively adapted to provide a running seal, means establishing a seal between said washer and housing, a casing encircling the shaft and movable relative to the housing and axially of the opening in the latter, said housing providing an expansion chamber on the side of the collar remote from the shaft and independent of the shaft, means preventing relative turning movement between said casing and housing, a circular ring-like piston disposed in said chamber and adapted to bear against said collar, means for admitting fluid under pressure to said expansion chamber to force the piston against the collar and to move the casing against the reaction of the collar in a direction away from the collar, and means connecting the casing and washer for movement in unison to cause the washer to bear against said collar with a degree of force commensurate with the pressure of fluid developed in the expansion chamber.

CHARLES F. VOYTECH.

References Cited in the file of this patent
UNITED STATES PATENTS

| Number | Name | Date |
|---|---|---|
| 2,265,953 | Mortensen et al. | Dec. 9, 1941 |
| 2,281,157 | Kanuch et al. | Apr. 28, 1942 |
| 2,330,781 | Langmyhr et al. | Sept. 28, 1943 |
| 2,505,968 | Jack | May 2, 1950 |
| 2,509,912 | Eliasson | May 30, 1950 |

FOREIGN PATENTS

| Number | Country | Date |
|---|---|---|
| 882,197 | France | of 1943 |